Figure 1:
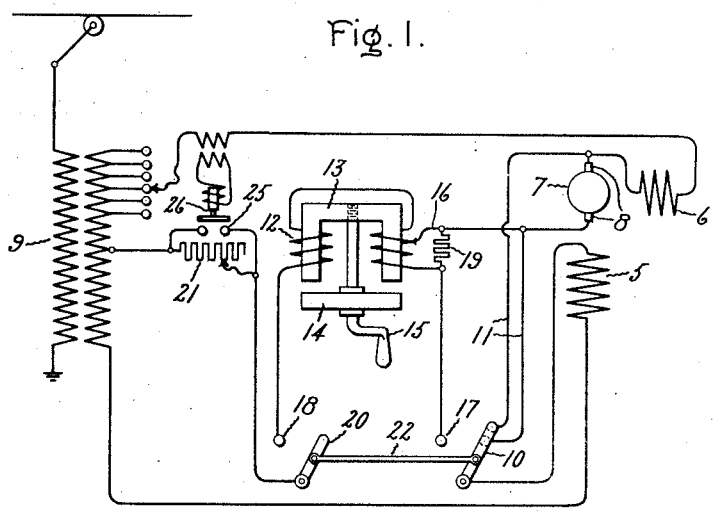

E. F. W. ALEXANDERSON.
ALTERNATING CURRENT MOTOR.
APPLICATION FILED OCT. 24, 1914.

1,194,265.

Patented Aug. 8, 1916.

Witnesses:
Earl G. Klock.
J. Ellis Glen.

Inventor:
Ernst F. W. Alexanderson
by Allen B. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

1,194,265. Specification of Letters Patent. Patented Aug. 8, 1916.

Application filed October 24, 1914. Serial No. 868,384.

*To all whom it may concern:*

Be it known that I, ERNST F. W. ALEXANDERSON, a citizen of the United States, residing at Schenectady, in the county of Schenectady, State of New York, have invented certain new and useful Improvements in Alternating-Current Motors, of which the following is a specification.

My invention relates to alternating current commutator motors, and particularly to alternating current commutator motors of the type disclosed in my United States Letters Patent No. 923,754, dated June 1, 1909.

The object of my invention is to provide an improvement in the arrangement of the motor connections described in that patent, and particularly to provide an improved and novel connection for the full-speed operation of the motor for the purpose of improving the commutation of the motor.

My present invention relates particularly to an alternating current motor of the type disclosed in my above mentioned Patent No. 923,754. This motor has two stator windings, an inducing or compensating winding and an exciting winding, arranged with their axes of magnetization electrically at right angles to each other. The rotor of the motor has a commuted armature winding with the commutator brushes arranged to produce an axis of magnetization of the armature winding in line with that of the inducing winding. For reasons stated in my prior patent, it is advantageous in the operation of such a motor for traction purposes to use when starting a connection known as a repulsion motor connection, that is, with the armature connected in a closed local circuit, and to use for operation at full-speed a double-fed series connection, that is, with the exciting and armature windings on the one hand and the inducing winding on the other hand separately supplied with current. As further pointed out in my prior patent, this arrangement is of particular advantage if the inducing winding is designed with a greater number of turns than the armature winding. By way of example, I will assume that the inducing winding has twice as many turns as the armature winding, in which case during starting with the repulsion motor connection the armature current is twice as great as the inducing winding current, so that the starting torque is twice as great as would be the case if all the windings were connected in series, and the same current were maintained in the exciting winding in both cases. The current in the exciting winding is limited at starting by the permissible voltage induced in the coils of the armature which are short-circuited by the commutator brushes. It is obvious that a simple series connection of the motor windings for full speed operation is not suitable if the inducing or compensating winding has a greater number of turns than the armature winding, because the motor in that case would be excessively over-compensated, and in my prior patent I pointed out that suitable full-speed operating characteristics are obtained if the exciting and armature windings on the one hand and the inducing winding on the other hand are separately fed or supplied with electric energy.

The armature coils short-circuited by the commutator brushes during the commutation of a motor of the type disclosed in my aforementioned patent are subject to three induced electromotive forces. An electromotive force is induced in the short-circuited armature coils by cutting the inducing field, and depends both on the armature speed and on the strength of the inducing field, which latter increases with the speed. A second electromotive force is induced in the short-circuited coils by the transformer action of the exciting or cross field, and depends only on the motor current, which latter tends to decrease with increase speed. These two electromotive forces are approximately in opposition and tend to balance one another at low speeds, but at high speeds the electromotive force induced by cutting the inducing field becomes excessive. In accordance with the method of operation described in my prior patent, the motor connections are modified as the motor speed increases to produce gradually decreasing inducing field strength. The third electromotive force induced in the short-circuited armature coils is due to commutation reactance, that is, to the reversal of current in each armature coil as each passes under a brush, and is in phase with the armature current and approximately 90° out of phase with the two electromotive forces which have heretofore been considered. In order to neutralize the electromotive force of commutation reactance, it is necessary to produce a field to be cut by the short-circuited coils, which is in phase with the motor current. In my prior patent I have pointed out that such a field can be produced by short-circuiting the armature through a reactive or inductive winding, and I have further found that such a field may be produced by connecting a reactance or inductive winding in the armature circuit. Preferably, I provide for full-speed operation of the motor means including one common connection for separately supplying current to the exciting and armature windings on the one hand and to the inducing winding on the other hand, and include an auxiliary inductive winding or reactance in the common connection. The auxiliary reactance interposes a reactive voltage in the circuit of both the armature winding and the inducing winding, and is adapted by suitable adjustment to so modify in phase and magnitude the currents supplied to and flowing through these windings as to produce the desired and necessary commutating flux for inducing in the short-circuited armature coils an electromotive force opposing the electromotive force of commutation reactance. The auxiliary reactive winding, however, imparts to the motor as a whole additional reactance, and consequently tends to lower the power factor of the motor.

My present invention has for its object the provision of means whereby the effect of the auxiliary reactance on the power factor of the motor is minimized.

The purpose of my present invention is then to improve the commutation of the motor, hereinbefore described, while operating at full-speed with the double-fed series connection of the motor windings, without materially lowering the power factor of the motor.

Figure 2:
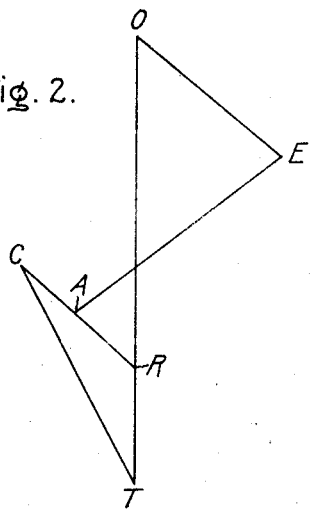

The novel features of my invention which I believe to be patentable are definitely indicated in the claims appended hereto. These features together with the application of the same to an alternating current commutator motor will be understood by reference to the following description taken in connection with the accompanying drawings, in which;

Figure 1 is a diagrammatic view of an alternating current commutator motor of the type described in my hereinbefore mentioned patent and embodying the features of my present invention; and Fig. 2 is a vector diagram of the voltage relations of the various windings of the motor illustrated in Fig. 1.

The motor has two stator windings, an inducing or compensating winding 5 and an exciting winding 6, arranged with their magnetizing axes at right angles to each other. The armature winding 7 is a commuted winding having coöperating brushes 8 so arranged that its axis of magnetization coincides with that of the inducing or compensating winding. A transformer 9 supplies current to the motor, and since the motor is particularly adapted for railway work, I have represented the primary of the transformer connected between a trolley wire and ground. A switch arm 10 is adapted to bridge the terminal contacts of two conductors 11 for short-circuiting the armature winding during the starting of the motor, and simultaneously to electrically connect the exciting winding 6 and the inducing winding 5 in series relation.

Fig. 1 of the drawings represents the motor connections at starting when the armature winding is short-circuited in order to obtain repulsion motor characteristics. When the speed of the motor has attained the desired magnitude, the short-circuit connection around the armature winding is adapted to be opened, and the exciting and armature windings, connected in series, on the one hand and the inducing winding on the other hand are then separately supplied with current from the same transformer winding through one common connection. In accordance with my present invention, a reactive transformer winding is adapted to be included in a novel manner in the common connection of the means provided for separately feeding the exciting and armature windings on the one hand and the inducing winding on the other hand. As shown in the drawings, the common connection is between one terminal of the armature winding and an intermediate point on the secondary winding of the main supply transformer 9, and a reactive transformer winding 12 is included in this connection. I have employed the expression reactive transformer winding to cover a transformer winding having reactance, and obviously intend to include in the expression transformer winding an auto-transformer such as is illustrated in Fig. 1 of the drawings.

The reactive transformer winding 12 is wound on an iron core 13 forming part of a magnetic circuit having an adjustable air gap. To this end, an iron armature 14 coöperates with the core 13 and is movable toward and away from the core by means of a screw 15. By means of the screw 15 the reactance of the winding 12 may be adjusted to suitably modify the phase of the currents supplied to the inducing and armature windings. A tap 16, adjustable if desired, is provided intermediate the ends of the transformer winding and is permanently connected to one terminal of the armature winding. The transformer winding is provided with terminal contacts 17, and 18. A non-inductive resistance 19 is electrically connected between the tap 16 and the contact 17 in shunt to that portion of the transformer winding included between these two points of connection. The switch arm 10 is adapted to connect the contact 17 to one terminal of the inducing winding. A second switch arm 20 is adapted to connect the contact 18 to an adjustable terminal of a non-inductive resistance 21. The other terminal of the resistance 21 is connected to an intermediate point on the secondary winding of the main transformer 9.

The terminals of the resistance 21 are further electrically connected to contacts 25 of a solenoid-operated switch 26. The operating relay coil of this switch is connected in series relation with the exciting and armature windings, and when the current in these windings falls below a predetermined value the switch operates to bridge the contacts 25, thus short-circuiting the resistance 21. The resistance 21 is in effect a transition resistance, and is employed when the change from the repulsion motor connection to the double-fed series motor connection is made. Thus the resistance 21 is at first included in the common connection of the means for separately supplying current to the two sets of motor windings and operates to prevent the flow of too large a current in the armature circuit. As the back electromotive force induced in the armature winding increases, the armature current decreases, and at the desired predetermined current value the switch 26 operates to short-circuit the resistance 21.

The switch arms 10 and 20 are mechanically connected to, but electrically insulated from, one another by an operating link 22 so that the two arms may be simultaneously manipulated. Thus, when the arm 10 engages the terminal contacts of the conductors 11, the arm 20 is disengaged from the contact 18 and the transformer winding 12 is not connected in any completed electric circuit. The arms 10 and 20 simultaneously engage the contacts 17 and 18, respectively, to include the transformer winding 12 in the common connection between one terminal of the armature winding and an intermediate point on the main transformer winding.

Fig. 1 represents the connections of the motor windings for starting. The switch arm 10 bridges the terminal contacts of the conductors 11 to connect the armature winding in a closed local circuit and the motor starts as a repulsion motor. When the motor has attained the desired speed to change over to the double-fed series connection, the switch arms 10 and 20 are moved toward the left into engagement with the contacts 17 and 18, respectively. This effects the full-speed running connection of the motor windings. The position of the intermediate tap 16 on the transformer winding 12 is determined to give the desired distribution of current through the two sections of such transformer winding. The winding 12 is a true transformer winding, and the magnetizing current taken by it may be adjusted to secure the proper phase relation between the currents in the armature and inducing windings necessary to produce the desired commutating field in phase with the armature current for neutralizing the electromotive force of commutation reactance.

The electromotive force of commutation reactance must be neutralized by an electromotive force induced in the short-circuited armature coils by the cutting of a field substantially in time phase with the armature current and in line with the axis of magnetization of the armature and compensating windings. The main flux of the motor in line with the axes of magnetization of the armature and compensating windings is a transformer flux and is approximately 90° out of phase with the armature current, and is hence not available to neutralize the electromotive force of commutation reactance. The magnetizing effect of the current flowing in the armature winding is neutralized by that of the current flowing in the inducing winding when the motor is perfectly compensated, as we will assume is the case for the purposes of explanation. It is therefore, necessary to produce in effect an over-compensation of the motor in order to have a resultant commutating flux in phase with the armature current. The over-compensation of the motor may be effected by reducing the armature current, or by increasing the inducing winding current, or by a combination of both means. A reactance in the common connection in the means for separately supplying current to the exciting and armature windings on the one hand and to the inducing winding on the other hand produces the desired result, since it interposes a reactance voltage in this circuit which is adapted to modify in phase and magnitude the currents supplied to the armature and inducing windings. As will be understood by those skilled in the art, such a modification in phase and magnitude of the currents supplied to the armature and inducing windings provides means for producing a commutating flux of the desired phase and magnitude for neutralizing the electromotive force of commutation reactance. In accordance with the novel connection of my present invention, the reactive winding included in the common connection between the armature winding and the main transformer is a true transformer winding and possesses the well recognized advantages of a transformer winding over a mere reactive winding. The proper phase relation of the currents supplied to the armature and inducing windings is obtained by suitably adjusting the magnetizing current of the transformer winding 12. Since the two sections of the transformer winding 12 are magnetically in opposition the resultant magnetization is determined by the difference in the magnetizing effects of the two sections, and by adjustment of the position of the tap 16 the degree of magnetization may be adjusted, and hence the desired phase relation between the armature and inducing winding currents may be obtained. The use of the reactive transformer winding thus provides means for the desired relative phase adjustment of the currents in the armature and inducing windings to produce the necessary commutating flux for neutralizing the electromotive force of commutation reactance with a minimum impairment of the power factor of the motor.

Fig. 2 of the drawings vectorially represents the voltage relation across the various windings of the motor illustrated in the Fig. 1 when the motor windings are connected in series for full-speed operation. OT represents the voltage of the main transformer winding 9 across which the motor is connected. OE represents the voltage across the exciting winding 6, while CT represents the voltage across the inducing or compensating winding 5. CR represents the voltage across the reactive transformer winding 12, and AE represents the voltage across the armature winding 7. The reactive voltage drop AR between the armature winding and the main transformer determines the angle between the lines OT and CT and consequently the phase of the current supplied to the inducing winding. It will be observed by those skilled in the art that by the use of a reactive transformer winding in accordance with my present invention the proper phase of the voltage CT of the inducing winding may be secured with a smaller reactive drop AR than has heretofore been possible.

The non-inductive resistance 19 may be omitted if desired. The effect of this resistance is to shunt a certain amount of current which would otherwise pass through the right hand section of the transformer winding 12. On the vector diagram of Fig. 2 this amounts to decreasing the angle between the vector voltages OT and CT.

The ratio of the voltages impressed on the exciting and armature windings on the one hand and on the inducing winding on the other hand is in the first instance such as to render the effective ampere turns of the armature winding substantially equal to the effective ampere turns of the inducing winding, in which event the armature reaction is just neutralized or compensated. As heretofore explained, to neutralize the electromotive force of commutation reactance the motor must in effect be slightly over-compensated, since the necessary commutating flux for neutralizing this electro-motive force is in phase with the armature current and corresponds in line and direction with the magnetization of the inducing winding. The transformer winding connected as herein described interposes a reactive voltage in the common connection of the means for feeding the two sets of motor windings which modifies the voltages impressed on these two sets of windings to the extent necessary for slightly over-powering the armature reaction, thereby producing the necessary commutating flux for neutralizing the electromotive force of commutation reactions. Due to the true transformer action of the reactive winding 12, the impairment of the power factor of the motor occasioned by the use of this reactive winding is quite materially minimized.

I have explained my invention by illustrating and describing a certain specific embodiment thereof, but it will be readily understood by those skilled in the art that the invention may be embodied in many other forms than that shown and described. I, accordingly, do not wish to be restricted to the particular arrangement disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. The combination with an alternating current motor having a commuted armature winding and an inducing winding and an exciting winding, of means for separately supplying current to the exciting and armature windings on the one hand and to the inducing winding on the other hand, a transformer winding connected in series relation with the inducing winding, and means for including a part only of said transformer winding in series relation with said exciting and armature windings.

2. The combination with an alternating current motor having a commuted armature winding and an inducing winding and an exciting winding, of a transformer winding connected in series relation with the inducing winding to form one circuit of the motor, and means for connecting the exciting and armature windings and a part only of said transformer winding in series relation to form a second circuit of the motor.

3. The combination with an alternating current motor having a commuted armature winding and an inducing winding and an exciting winding, of a transformer winding connected in series relation with the inducing winding to form one circuit of the motor, said transformer winding having a magnetic circuit with an air gap therein, and means for connecting the exciting and armature windings and a part only of said transformer winding in series relation to form a second circuit of the motor.

4. The combination with an alternating current motor having a commuted armature winding and an inducing winding and an exciting winding, of means including one common connection for separately supplying current to the exciting and armature windings on the one hand and to the inducing winding on the other hand, and a transformer winding included in said common connection, said transformer winding having a magnetic circuit with an air gap therein.

5. The combination with an alternating current motor having a commuted armature winding and an inducing and an exciting winding, of a source of electromotive force, a transformer winding electrically connected at a point intermediate its terminals to the armature winding and having one of its terminals electrically connected to said source and its other terminal electrically connected to said inducing winding, and means including said transformer winding and said source of electromotive force for separately impressing voltages on the exciting and armature windings on the one hand and on the inducing winding on the other hand.

6. The combination with an alternating current motor having a commuted armature winding and an inducing and an exciting winding, of a source of electromotive force, a transformer winding electrically connected at a point intermediate its terminals to the armature winding and having one of its terminals electrically connected to said source and its other terminal electrically connected to said inducing winding, said transformer winding having a magnetic circuit with an air gap therein, and means including said transformer winding and said source of electromotive force for separately impressing voltages on the exciting and armature windings on the one hand and on the inducing winding on the other hand.

7. The combination with an alternating current motor having a commuted armature winding and an inducing winding and an exciting winding, of a source of electromotive force, means including one common connection for separately impressing voltages derived from said source on the exciting and armature windings on the one hand and on the inducing winding on the other hand, the ratio of the voltages impressed on the exciting and armature windings on the one hand and on the inducing windings on the other hand being such that the effective ampere turns of the armature winding are substantially neutralized by the effective ampere turns of the inducing winding, and a transformer winding included in said common connection and adapted to modify the phase and magnitude of the voltages impressed on the armature winding and on the inducing winding to the extent necessary for producing a commutating flux for neutralizing the electromotive force of commutation reactance, said transformer winding having a magnetic circuit with an air gap therein.

8. The combination with an alternating current motor having a commuted armature winding and an inducing winding and an exciting winding, of a source of electromotive force, means including one common connection for separately impressing voltages derived from said source on the exciting and armature winding on the one hand and on the inducing winding on the other hand, and a transformer winding included in said common connection and electrically connected at a point intermediate its terminals to the armature winding.

9. The combination with an alternating current motor having a commuted armature winding and an inducing winding and an exciting winding, of a source of electromotive force, means including one common connection for separately impressing voltages derived from said source on the exciting and armature windings on the one hand and on the inducing winding on the other hand, and a transformer winding included in said common connection and electrically connected at a point intermediate its terminals to the armature winding, said transformer winding having a magnetic circuit with an air gap therein.

10. The combination with an alternating current motor having a commuted armature winding and an inducing winding and an exciting winding, of a source of electromotive force, means including one common connection for separately impressing voltages derived from said source on the exciting and armature windings on the one hand and on the inducing winding on the other hand, and an auto-transformer included in said common connection, said auto-transformer having a magnetic circuit with an air gap therein.

In witness whereof, I have hereunto set my hand this 22nd day of October 1914.

ERNST F. W. ALEXANDERSON.

Witnesses:
MARGARET E. WOOLLEY,
HELEN ORFORD.